United States Patent
Püskül et al.

(10) Patent No.: US 12,249,156 B2
(45) Date of Patent: Mar. 11, 2025

(54) METHOD AND DEVICE FOR GENERATING COMBINED SCENARIOS

(71) Applicant: Microvision, Inc., Redmond, WA (US)

(72) Inventors: Özgür Nurettin Püskül, Hamburg (DE); Jörn Boysen, Hamburg (DE); Jan Weidauer, Hamburg (DE)

(73) Assignee: Microvision, Inc., Redmond, WA (US)

( * ) Notice: Subject to any disclaimer, the term of this patent is extended or adjusted under 35 U.S.C. 154(b) by 328 days.

(21) Appl. No.: 17/891,585

(22) Filed: Aug. 19, 2022

(65) Prior Publication Data
US 2022/0405536 A1 Dec. 22, 2022

Related U.S. Application Data

(63) Continuation of application No. PCT/EP2021/053294, filed on Feb. 11, 2021.

(30) Foreign Application Priority Data

Feb. 20, 2020 (EP) .................................... 20158378

(51) Int. Cl.
  *G06V 20/56* (2022.01)
  *G06F 18/21* (2023.01)
  (Continued)

(52) U.S. Cl.
  CPC ............ *G06V 20/56* (2022.01); *G06F 18/211* (2023.01); *G06F 18/217* (2023.01); *G06F 18/24* (2023.01);
  (Continued)

(58) Field of Classification Search
  CPC ...... G06V 20/56; G06V 20/64; G06V 10/803; G06F 18/211; G06F 18/217; G06F 18/24;
  (Continued)

(56) References Cited

U.S. PATENT DOCUMENTS 10,668,621 B1 * 6/2020 Caldara ..................... G06T 7/70
11,079,492 B1 * 8/2021 Stumm .............. G01C 21/3833
(Continued)

FOREIGN PATENT DOCUMENTS

DE 20 2018 105 162 U1 11/2018

OTHER PUBLICATIONS

Kloeker et al. ("High-Precision Digital Traffic Recording with Multi-LiDAR Infrastructure Sensor Setups," 2020 IEEE 23rd International Conference on Intelligent Transportation Systems (ITSC), Rhodes, Greece, 2020, pp. 1-8, doi: 10.1109/ITSC45102.2020.9294543.) (Year: 2020).*
(Continued)

*Primary Examiner* — Lisa M Caputo
*Assistant Examiner* — Christian T Bryant
(74) *Attorney, Agent, or Firm* — Kevin D. Wills

(57) ABSTRACT

A method for generating combined scenarios for testing an object detection unit, wherein the method comprises provision of first sensor data of a first scenario and of second sensor data of a second scenario, wherein the first sensor data and the second sensor data in each case are a point cloud comprising a plurality of points, wherein the method further comprises a classification of the respective points of the first sensor data and of the respective points of the second sensor data into relevant or not relevant and merging of the first sensor data and of the second sensor data for obtaining third sensor data of a combined scenario, wherein only relevant points of the first sensor data and relevant points of the second sensor data are merged to form third sensor data of the combined scenario.

20 Claims, 5 Drawing Sheets

(51) Int. Cl.

| | |
|---|---|
| *G06F 18/211* | (2023.01) |
| *G06F 18/22* | (2023.01) |
| *G06F 18/23* | (2023.01) |
| *G06F 18/24* | (2023.01) |
| *G06F 18/25* | (2023.01) |
| *G06F 18/28* | (2023.01) |
| *G06F 40/30* | (2020.01) |
| *G06V 20/64* | (2022.01) |
| *G06V 10/80* | (2022.01) |

(52) U.S. Cl.
CPC ............ *G06F 18/251* (2023.01); *G06F 18/28* (2023.01); *G06F 18/22* (2023.01); *G06F 18/23* (2023.01); *G06F 40/30* (2020.01); *G06V 10/803* (2022.01); *G06V 20/64* (2022.01)

(58) Field of Classification Search
CPC ........ G06F 18/251; G06F 18/28; G06F 18/22; G06F 40/30; G06F 18/23
See application file for complete search history.

(56) References Cited

U.S. PATENT DOCUMENTS

2020/0097010 A1* 3/2020 Maila ................. B60W 50/029
2020/0218278 A1* 7/2020 Wang ................. G05D 1/0214

OTHER PUBLICATIONS

Wikipedia ("Ray casting." Wikipedia, The Free Encyclopedia. Wikipedia, The Free Encyclopedia, Jan. 25, 2020.) (Year: 2020).*
International Search Report issued by the European Patent Office for International Patent Application No. PCT/EP2021/053294, mailed on May 3, 2021.
Behmann, Nicolai et al., "Probabilistic 3D Point Cloud Fusion on Graphics Processors for Automotive (Poster)", 22th International Conference on Information Fusion, Jul. 2-9, 2019, pp. 1-6, SF—International Society of Information Fusion.
Vineet, Vibhav et al., "Incremental Dense Semantic Stereo Fusion for Large-Scale Semantic Scene Reconstruction". 2015 IEEE International Conference on Robotics and Automation (ICRA), May 26-30, 2015, pp. 75-82, IEEE, Seattle, WA, USA.
Yin, Zhou et al. "End-to-End Multi-View Fusion for 3D Object Detection in LiDAR Point Clouds", 3rd Conference on Robot Learning, Osaka, Japan, Oct. 15, 2019, pp. 1-10, ArXiv.org.
Dyer, Charles R., "Volumetric Scene Reconstruciton From Multiple Views", Foundations of Image Understanding Aug. 1, 2001, pp. 469-489, Kluwer, Boston, USA.
Morris, William et al., "3D Indoor Mapping for Micro-UAVs Using Hybrid Range Finders and Multi-Volume Occupancy Grids", Jan. 1, 2010, pp. 1-7, Retrieved from the Internet: Http://citeseerx.ist.psu.edu/viewdoc/download;jsessionid=96F8F9EDE8BB628328AFBC71F7F5CEED?doi=10.1.1.227.7397&rep=rep1type=pdf, City College of NY.

* cited by examiner

METHOD AND DEVICE FOR GENERATING COMBINED SCENARIOS

CROSS REFERENCE TO RELATED APPLICATIONS

This application is a continuation of International Application No.: PCT/EP2021/053294, filed on Feb. 11, 2021, which claims priority from European Patent Application No. 20158378.8, filed on Feb. 20, 2020, the contents of each of which are incorporated by reference herein.

FIELD OF THE INVENTION

The disclosure relates to a method as well as a device for generating combined scenarios for testing an object detection unit.

BACKGROUND

In the automotive industry, it is known to test as many scenarios as possible in the real environment in order to test an object detection unit, which is part of a driving assistance system or of a device for driverless navigation of a vehicle. It is further known from the prior art to artificially bring about scenarios of this type by means of an environment simulation system in order to provide for a reproducibility and a repeatability.

DE 20 2018 105 162 U1 describes, for example, an environment simulation system of this type for a test bench for testing technical systems or machines.

It is not discussed in the prior art, however, how the recorded data can lead to a complete evaluation of an object detection unit.

SUMMARY

The present disclosure is based on the object of providing a method for generating combined scenarios for testing an object detection unit, which, compared to the prior art, makes it possible to summarize more complicated scenarios from various scenarios, in order to be able to completely test an object detection unit. It is to further be ensured that the individual scenarios as well as the combined scenario can be evaluated.

The above-mentioned object is solved by means of the method according to the disclosure for generating combined scenarios for testing an object detection unit. The object detection unit is in particular part of a driving assistance system and/or of a device for the driverless navigation of a vehicle.

The method comprises the provision of first sensor data of a first scenario and of second sensor data of a second scenario, wherein the first sensor data and the second sensor data in each case comprise at least one point cloud comprising a plurality of points. In other words, at least one first point cloud is provided by a first scenario and at least one second point cloud is provided by a second scenario.

The method comprises the merging of the first sensor data and of the second sensor data in order to obtain third sensor data of a combined scenario, wherein the method comprises a classification of the respective points of the first sensor data and of the respective points of the second sensor data into relevant and not relevant, wherein only relevant points of the first sensor data and relevant points of the second sensor data are merged to form sensor data of the combined scenario. In other words, each point of the first sensor data and each point of the second sensor data is classified as either being relevant or not relevant. The term "combined" is to in particular be understood in such a way that the scenario is formed, in other words merged, from individual scenarios.

The term "scenario" is in particular a scene, which was recorded by a sensor. This scene comprises in particular at least one object. The scene can be dynamic or static. The scenario comprises in particular at least one point in time of a motion sequence of a dynamic object. The sensor data can further depict a period of time of a motion sequence. The sensor data then consist of temporally adjacent points in time, in other words snapshots, of the motion sequence. Each snapshot would then be provided with a time stamp.

The first scenario and the second scenario are in particular "simple scenarios". The respective sensor data in particular comprise only few objects, for example only one object. A combined scenario would then comprise several objects. The combined scenario is in particular a complex scenario, wherein the representability in a real environment is more difficult than in the case of a "simple scenario".

The method in particular comprises the acquisition of the sensor data of the first scenario and the acquisition of the sensor data of the second scenario. The sensor data are in particular acquired by means of a unit for acquiring sensor data. The first sensor data and the second sensor data are acquired in particular in a test bench, in which preferably at least one object, for example a robot, moves.

Sensor data could further also originate from a real environment and could have been "entered" by means of a unit for acquiring sensor data. In other words, this means that a vehicle was equipped with a unit for acquiring sensor data, and has "captured", in other words recorded, a corresponding scenario. Reference data for the determination of a ground truth are thereby preferably also recorded by means of a reference sensor, which is arranged on the vehicle accordingly. The ground truth and the sensor data can thereby be verified by means of a further camera. Based on the ground truth, objects in the sensor data can be labeled. Points of a point cloud can further be assigned to an object. Sensor data can therefore also be "extracted" from the recorded data. For example, only the points of the point cloud, which were assigned to an object, can be removed and can then represent sensor data with regard to only this object.

The ground truth comprises in particular the following parameters: the number of the objects in the scenario and/or in each case the object class, the remission of the object, the relative speed, the direction of movement, the distance from a unit for acquiring the sensor data, the environmental conditions, for example rain or fog, and/or the position, preferably in an acquisition region of the unit for acquiring the scenarios (for example top right). This information or these parameters, respectively, are determined in particular from the reference data and are preferably verified manually.

The first scenario and the second scenario preferably differ, namely in particular in at least one of the following parameters: The number of objects, which can be seen in the scenario, the object class, the remission of the object, the relative speed, the direction of movement, the distance from a unit for acquiring the sensor data, the environmental conditions, for example rain or fog, and/or the position, preferably in an acquisition region of the unit for acquiring the scenarios (for example top right). The first sensor data and the second sensor data are preferably acquired at different locations, for example within a test bench, and/or at different points in time. The first sensor data of the first scenario and the second sensor data of the second scenario are not different views of the same scene. On the contrary, the first sensor data and the second sensor data are preferably based on different scenes. This means that the combined scenario did not take place in reality to the recording of the first sensor data and of the second sensor data, but is combined from the different scenes.

As a result of merging the first sensor data and the second sensor data, the third sensor data of a combined scenario are obtained, which likewise represent at least one point cloud. In other words, the third sensor data are the common sensor data of the first sensor data and of the second sensor data, wherein the classification serves the purpose of merging the sensor data so that a meaningful result is attained.

The advantage of the method lies in that sensor data of combined scenarios, that is, in other words, sensor data of complex scenarios, which could not be represented in this complexity or at least only with large effort in a test bench, can be merged by means of sensor data of simple, easily reproducible scenarios. In reality, these complex scenarios can also not be reproduced with a sufficient repeatability. A higher coverage of scenarios is thus realized, without having to "drive in" these scenarios on public roads, which could possibly lead to high-risk situations, or without having to recreate them in a complex manner in test benches.

As part of the classification, the first sensor data and the second sensor data are in particular represented in a common voxel map. The latter is attained in particular with the help of a voxelizer, which enters the points of the point cloud of the first sensor data and the points of the point cloud of the second sensor data in a common voxel map. In other words, the points of the point clouds are entered in a three-dimensional space, which is segmented by means of the definition of the voxels, by means of the voxelizer. The point clouds are not only defined in a punctiform manner in space, but can in each case be assigned to a corresponding voxel. This serves the purpose of establishing a spatial relationship between the points of the first sensor data and the points of the second sensor data.

Free voxels can be identified as free spaces. A received measuring pulse can in particular be assigned to each point of a point cloud. A voxel, which depicts the position, among others, at which the measuring pulse was reflected, can be assigned to the point and thus also to the measuring pulse. This received measuring pulse has an energy, so that an energy can be assigned to each point of the point cloud. Each voxel can further be assigned an energy of the points located therein. In particular, the energy of the points, which are assigned to a common voxel, is added. If the energy lies above a previously defined threshold value, the voxel is identified as being occupied and thus as not being free. If the energy lies below the threshold value, the corresponding voxel is identified as being free.

A free voxel can thus be a voxel without points with an energy above the threshold value. With the help of the common representation within a voxel map, it is possible to identify free spaces, which is not possible in the case of a normal point cloud representation. Free voxels, which are located behind an occupied voxel in the radial direction, can further be identified because measuring pulses resulting from these voxels cannot be detected. Points, which in each case lie in a voxel, which is arranged radially behind an occupied voxel, can thus already be classified as not being relevant at this point.

In addition, the respective sensor data can be represented in individual voxel maps, wherein they can then be combined to form a common voxel map. Free spaces can already be identified in the case of this individual representation. These free spaces can then be validated in the representation in a common voxel map.

The method can further comprise a respective identification of objects on the basis of the first sensor data and of the second sensor data, wherein the position of the detected objects of the first sensor data and of the second sensor data is compared in order to recognize possible overlaps and/or masking of the detected objects. The term "masking" in particular refers to a region, which is masked by an object. In other words, the respective detected objects are brought into a spatial relationship to one another. The objects are preferably represented in a common space, wherein it can then be detected whether objects overlap and/or mask one another.

Objects are preferably identified at least as a portion of the sensor data, which has a cohesive spatial form or geometry, respectively. For identification purposes, corresponding portions of the sensor data with a cohesive geometry can thus be detected. In the alternative, the ground truth can also be used. The ground truth can comprise information relating to the number of objects, respective object classes and/or positions. This knowledge from the ground truth can be used for the object detection in that, for example, a comparison is made between the form and/or the position of a detected object and the corresponding information from the ground truth.

One possibility for comparing the positions of the detected objects would be to assign voxels of the common voxel map to the detected objects. Voxels, which are assigned to an object with regard to both sensor data, are thus based on an overlap. Voxels, which are assigned to an object of a point cloud, but lie behind a voxel of an object of the other point cloud, are masked by the object of this other point cloud.

The method can comprise the identification of noise points. Noise points do not originate from objects, but result from a noise. Noise points are detected in particular by means of proximity comparisons of adjacent points of a point cloud and/or corresponding adjacent voxels. A base level of the received energy can in particular be determined by means of proximity comparisons, wherein points, whose energy does not differ significantly from this energy level, are identified as noise points. In detail, each received measuring pulse has an energy, so that an energy can be assigned to each point of the point cloud. Each voxel can further be assigned an energy of the points located therein. The energy of the points, which are assigned to a common voxel, is in particular added. The energy of the directly adjacent neighbors of a voxel can further be averaged (to determine the "base level") and can be compared to the energy of the voxel. If the energy thereof falls below, for example, a previously specified percentage of the averaged energy as threshold value, all points located in the voxel can be identified as noise point. A threshold value, which considers more than only the directly adjacent voxels, can further also be specified. For example, all voxels can be considered, which are located below a specified distance from the voxel.

The classification can further take place on the basis of identified objects, identified free spaces and/or identified noise points. As part of the classification, relevant points and irrelevant points are in particular marked with the help of a point cloud marker.

For example, identified noise points belong to the irrelevant points. In particular points, on the basis of which a merging of different scenarios makes sense in order to obtain third sensor data of a realistically combined scenario, are selected and are classified as being relevant.

Masked points of a point cloud can be classified as not being relevant as part of the classification, wherein the points within the voxel map are masked by at least one point of the same and/or of the other point cloud.

For example, the points, which are masked by other points of the same or of a different point cloud, can already be classified as not being relevant on the basis of the free space detection. The voxel, which is thus in each case radially occupied first, defines that all points, which lie in voxels located radially behind said points, are classified as not being relevant.

As part of the classification, points of a point cloud can further be classified as not being relevant when the points are masked by an object of the other point cloud. For example, an object, which originates from the one point cloud, could lie radially in front of the points of the other point cloud. These masked points can be assigned, for example, to an object of these other points. However, these points are masked by the object of the other points in such a way that the consideration thereof makes no sense because the third sensor data of this combined scenario, if recorded in such a way, would not include the points due to the masking.

As part of the classification, points of a point cloud can further be classified as not being relevant when the points lie within an object of the other point cloud. An analogous logic applies here. Corresponding points could not have been detected in the combined scenario due to the presence of the object of the other point cloud, so that merging these points in a common point cloud makes no sense.

As part of the classification, points of a point cloud can be classified as not being relevant when the points originate from a first object, which overlaps with a second object of the other point cloud. In the case of an overlap, an object, which was identified by means of the first sensor data, overlaps with an object, which was identified by means of the second sensor data. Due to the overlap, a merging of all corresponding points of the overlapping objects cannot make any sense. A decision can thus be made to accept only the points of one of these objects into the third sensor data of the combined scenario. It then makes sense to classify all points of the other object, which overlaps with the second object, as not being relevant.

As part of the classification, points of a point cloud can also be classified as not being relevant when the points appear in both sensor data. For example, an object can have been detected in both sensor data at exactly the same location. It then makes sense to classify the points, which appear twice, in only one of the point clouds as not being relevant.

Masked points can thus be understood to be irrelevant points. They can be masked within the voxel map by at least one point of the same and/or of the other point cloud, by other points of the same or of another point cloud and/or by an object of the other point cloud. They can also be masked because they lie within an object of the other point cloud and/or originate from a first object, which overlaps with a second object of the other point cloud.

Irrelevant points can further be understood to be redundant points because they appear in the first sensor data and the second sensor data, and/or as noise points.

The merging of the first sensor data and of the second sensor data comprises in particular an entry of the points, which are classified as being relevant, of the first sensor data and of the second sensor data in a common coordinate system. The merging can further comprise the storing in a common data set. A point cloud, which was merged and which represents a combined scenario of the two scenarios, is thus attained as result.

The method can also comprise the above steps for further scenarios, wherein the merging comprises the first sensor data, the second sensor data, and further sensor data.

When the first sensor data and second sensor data in each case depict a period of time, which serves the purpose of depicting the motion sequence of an object, the above-mentioned steps are performed for various points in time, in other words, snapshots, of the respective motion sequence of the sensor data. In such a case, the first sensor data and the second sensor data comprise several point clouds at different points in time of the respective depicted period of time. They form the corresponding snapshots. A respective point cloud of the first sensor data is thus always merged with a point cloud of the second sensor data, from which a motion sequence of the objects contained in the combined scenario results. The third sensor data of the combined scenario thus likewise depict a period of time and can thus comprise several received point clouds.

In the case of sensor data with a different period of time, they can generally be combined differently, depending on when the merging starts. In other words, the sensor data can be shifted relative to one another on a time scale. The temporal relation between the snapshots of the same sensor data is always maintained. In other words, the sensor data of a period of time are neither temporally "stretched" nor "compressed", but they are combined with other sensor data in the temporal sequence and the temporal distance, in which they were recorded. The merging is easily possible because the first sensor data and the second sensor data are combined from several point clouds at different points in time of the respective depicted period of time, so that a different temporal combination simply means that, in terms of time, other point clouds are merged.

The periods of time, which depict the first scenario and the second scenario, do not have to be of identical length. If, for example, the first sensor data and the second sensor data have different periods of times, the longer period of time can simply be used. When merging the corresponding snapshots of the sensor data, only the "last snapshot" of the sensor data of the shorter periods of time can simply be used starting at the end of the shorter period of time. This corresponds to the real case that, starting at this point in time, the object, which is depicted in the sensor data with a shorter period of time, no longer moves. Or only the snapshots of the sensor data of the longer period of time are simply still used because snapshots of the sensor data of the shorter period of time are no longer at hand, so that a real merging actually does not take place anymore. The same can refer to the starting point in time of the combined scenario. In other words, one scenario could already start earlier, and another one could be "added" later.

For example, the first sensor data have a length of 10 seconds, and the second sensor data have a length of 4 seconds. The periods of time could now be shifted relative to one another in any desired way. For example, the first sensor data could "be started" immediately, and the second sensor data could start only after the third second. This would mean that only the corresponding snapshots of the first three seconds of the first sensor data are present before the third second. In other words, a merging does not take place. In terms of time, snapshots of both sensor data are present between the third and the seventh second, so that they are merged. In detail, the snapshots of the fourth to seventh second of the first sensor data are combined with the corresponding snapshots of the first to fourth second of the second sensor data. After the seventh second, there are two options. The first sensor data could be allowed to continue to run, i.e. one could take the snapshots of the last three seconds of the first sensor data, without merging, because corresponding snapshots of the second sensor data are no longer present, or one takes the "last snapshot" of the fourth second of the second sensor data, and merges it with the corresponding snapshots of the first sensor data for the remainder of the period of time. As a whole, the first three seconds of the third sensor data thus consist only of the snapshots of the first sensor data, between the third and the seventh second of the merging of the snapshots of both sensor data, and after the seventh second either of the merging of the "last snapshot" of the second sensor data and the corresponding snapshots of the first sensor data, or only of the snapshots of the first sensor data.

First sensor data, which depict a motion sequence, and second sensor data, which depict a static object, and thus strictly speaking "statistical" sensor data, can further also be merged in that different points in time of the first sensor data are in each case merged with the "static" second sensor data.

The method can in particular comprise the provision of a first ground truth for the first scenario and a second ground truth for the second scenario. The first ground truth and the second ground truth can in particular be determined by means of reference data, wherein the method can comprise the acquisition of the first scenario and of the second scenario by means of at least one reference sensor for acquiring these reference data. The reference data are in particular a point cloud, so that the reference sensor is a Lidar sensor. The reference data can also be image data or radar data with a camera or a radar sensor as reference sensor.

The first and the second ground truth in particular serve the purpose of validating the first scenario and the second scenario. The ground truth reproduces that, which should be detectable in the respective sensor data. The method in particular comprises a validation of the first sensor data of the first scenario and of the second sensor data of the second scenario.

The method in particular comprises a merging of the first ground truth and of the second ground truth to form a ground truth of the combined scenario. The summarization comprises in particular a summarization of the determined above-mentioned parameters. The ground truth of the combined scenario likewise serves the purpose of validating the third sensor data of the combined scenario. A very simple example is as follows: The ground truth of the first sensor data can be "car, coming from the left", and the ground truth of the second sensor data can be "bicycle rider, coming from the right", so that the ground truth of the third sensor data would be "both car, coming from the left, and bicycle rider coming from the right".

The method can further comprise the testing of an object detection unit, wherein the testing comprises the provision of the third sensor data of the combined scenario, and a comparison of the objects detected by the object detection unit to the ground truth of the combined scenario. In detail, the object detection unit is formed to determine at least one, in particular all of the above-mentioned parameters, preferably at least one number of the detected objects and a respective object class. This output of the object detection unit can be compared to the ground truth. A comparison can be made, for example, whether the object detection unit has detected the same number of objects and/or in each case the correct object class. The parameters determined by means of the object detection can be compared to the corresponding parameters of the ground truth.

The term "testing" can in particular be understood to be a training of the object detection unit. The object detection unit can in particular comprise a detection module, which comprises a neuronal network with weights. The third sensor data can thus be used to adapt the weights between the neurons, in that, as described above, an output of the object detection unit is compared to equivalent parameters of the ground truth.

The "testing" can further be understood to be a control of already adapted weights. In this case, the weights are no longer changed, but a learning progress of the network is instead analyzed on the basis of the already adapted weights form the previous training phase.

The method can additionally comprise the generation of a library for generating sensor data of combined scenarios, in which the sensor data and optionally the corresponding ground truth of different scenarios are stored. "Storing" is to in particular be understood to be a saving. The stored sensor data were in particular acquired beforehand. The combined scenarios are generated in particular as described above. The stored scenarios are classified or categorized, respectively, by specifying the following parameters, for example the object class, which can be seen in the scenario, the remission of the object, the relative speed, the direction of movement, the distance from a unit for acquiring the sensor data, the environmental conditions, for example rain or fog, and/or the position, preferably in an acquisition region of the unit for acquiring the scenarios (for example top right).

The method can comprise the use of the library in order to generate sensor data of defined combined scenarios. The library can further be used to merge randomized sensor data, in order to thus generate sensor data of combined scenarios. This can take place in an automated or manual manner. By means of all meaningful permutations, combinations of the sensor data of all of the previously stored scenarios can be generated, for example. For example, all meaningful combinations of sensor data of two and/or three of the stored scenarios can be generated thereby. A large amount of different combined scenarios is thus created. In particular a combination of a scenario with itself would not make sense thereby, wherein the corresponding combinations for this would need to be ruled out. The sensor data of combined scenarios, which are merged with the help of the library, can be used to test an object detection unit in an automated manner. The corresponding ground truths of the combined sensor data are in particular also combined and are used for the testing.

It is advantageous that, in contrast to the prior art, not all possible scenarios have to be "driven in". The term "driving in" describes that a vehicle is equipped with a corresponding unit for detection and a reference sensor, wherein very long driving times are necessary thereby in order to actually be able to also find and to capture all possibilities in a real condition. This effort can be eliminated at least to a large extent by means of the use of the library because many scenarios from stored scenarios can be combined.

In a further aspect, the disclosure relates to a device for generating combined scenarios for testing an object detection unit, wherein the device comprises a unit for merging the first sensor data and the second sensor data for obtaining third sensor data of a combined scenario. The device further comprises a classification unit for classifying the respective points of the first sensor data and of the respective points of the second sensor data into relevant and not relevant. The device is preferably formed for carrying out the above-described method.

The device can further comprise a unit for acquiring the first and the second sensor data, wherein this is preferably a Lidar sensor. The point clouds of the first sensor data and of the second sensor data are thus Lidar point clouds. The unit is in particular formed to send measuring pulses by means of a sending unit comprising several sending elements, and to receive reflected measuring pulses by means of a receiving unit comprising several receiving elements. Each sending unit can thereby be assigned to a respective receiving element and to a respective three-dimensional section of the measuring region, i.e. a voxel. The point resulting from the receipt of a measuring pulse can thus be assigned unambiguously to a voxel.

The classification unit can in particular comprise a voxelizer for the first and the second sensor data, which represents the corresponding sensor data in a voxel map. The device can additionally comprise a free space detection unit, which detects free space in the common voxel map.

The classification unit preferably further comprises an object detection unit, which detects objects on the basis of the respective sensor data. The device can further comprise an object merging unit, in other words, a unit for merging the detected objects, so that overlaps and/or masking of the objects can be detected.

The classification unit further in particular comprises a noise point identification unit, which is formed to directly identify noise points.

The device can further comprise a point cloud marker, which marks points of the different sensor data as being relevant and as not being relevant on the basis of the identified objects, of the identified free space, and of the identified noise points. The device can further comprise a unit for merging the first and the second sensor data, which can store the points of the first sensor data and of the second sensor data, which are classified as being relevant, in a common coordinate system.

The solution further comprises a computer program product, which comprises a computer-readable storage medium, on which a program is stored, which, after it has been loaded into the memory of the computer, makes it possible for a computer to carry out an above-described method for the classification of objects and/or for the distance measurement, optionally in cooperation with an above-described device.

The disclosure additionally relates to a computer-readable storage medium, on which a program is stored, which, after it has been loaded into the memory of the computer, makes it possible for a computer to carry out an above-described method for the classification of objects and/or for the distance measurement, optionally in cooperation with an above-described device.

BRIEF DESCRIPTION OF THE DRAWINGS

Schematically.

DETAILED DESCRIPTION OF THE PREFERRED EMBODIMENTS

Figure 1:
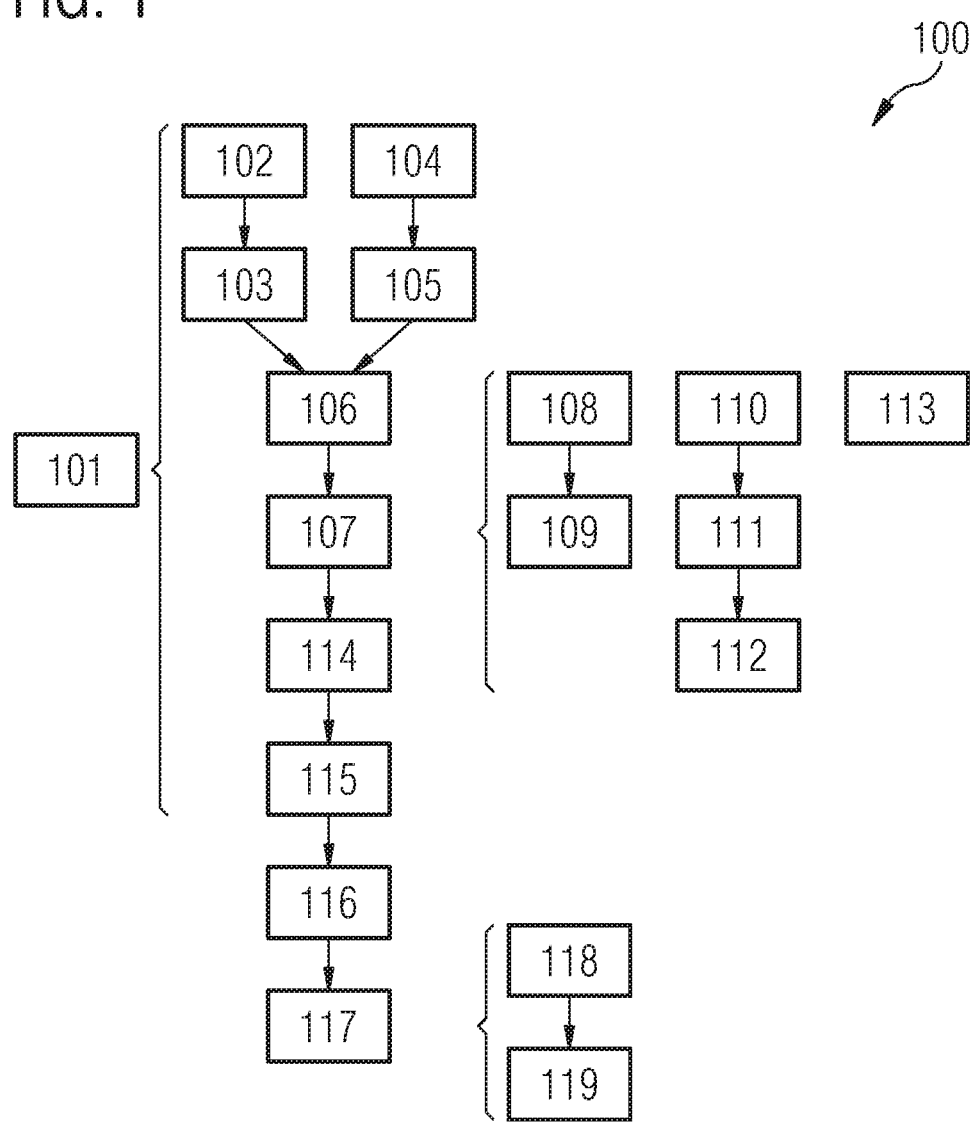
FIG. 1 shows a schematic diagram of a method according to the disclosure.

FIG. 1 shows a schematic diagram of a method 100 according to the disclosure, which comprises the following steps:

The method 100 serves the purpose of generating 101 combined scenarios for testing 117 an object detection unit 17. The method 100 can in particular comprise the generation 101 of combined scenarios.

The method 100 comprises the provision 103 of first sensor data 11 of a first scenario and of second sensor data 12 of a second scenario. The method 100 can comprise the prior acquisition 102 of the first sensor data 11 and of the second sensor data 12.

The method 100 can further comprise the provision 105 of a first ground truth for the first scenario and of a second ground truth for the second scenario, wherein the method 100 can further preferably comprise the acquisition 104 of the two ground truths.

Based on the provided ground truth, the first sensor data 11 of the first scenario and the second sensor data 12 of the second scenario can be validated 106.

The method 100 comprises a classification 107 of the respective points 11*a* of the first sensor data 11 and of the respective points 12*a* of the second sensor data 12 into relevant or not relevant. For the classification, the method 100 can comprise the representation 108 of the first sensor data 11 and of the second sensor data 12 in a common voxel map 23, wherein free voxels can be identified 109 as free spaces.

The method 100 can further comprise the identification 110 of objects on the basis of the first sensor data 11 and of the second sensor data 12. The positions of the detected objects can be compared 111 thereby and possible overlaps and/or masking of the objects can thus be detected 112. The method 100 can further comprise the identification 113 of noise points 24.

The method 100 further comprises the merging 114 of the first sensor data 11 and of the second sensor data 12 for obtaining third sensor data 28 of the combined scenario. A combined scenario is generated 101 in this way.

The merging 114 can comprise the entry 115 of the points classified as being relevant in a common coordinate system.

The method 100 can further comprise the merging 116 of the first ground truth and of the second ground truth to form a ground truth of the combined scenario.

The method can additionally comprise the testing 117 of an object detection unit 17, wherein the testing 117 can comprise the provision 118 of the third sensor data 28 of the combined scenario as well as a comparison 119 of the objects detected by the object detection unit 17 to the ground truth of the combined scenario.

Figure 2:
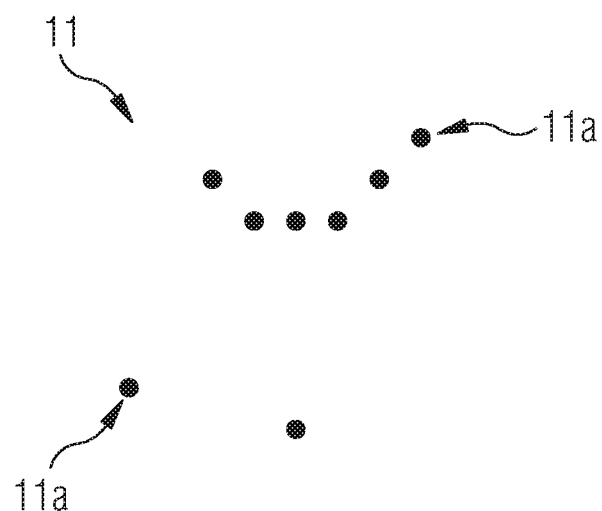
FIG. 2 shows first sensor data.

FIG. 2 shows first sensor data 11. The first sensor data thereby represent a point cloud, wherein the individual points 11*a* of the first sensor data are clearly visible.

Figure 3:
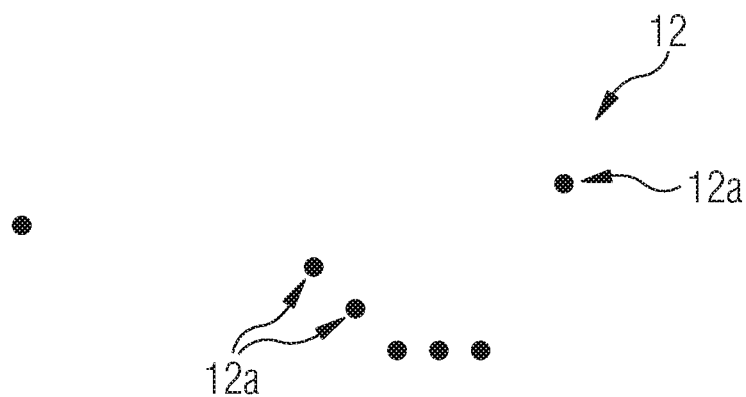
FIG. 3 shows second sensor data.

FIG. 3 illustrates second sensor data 12, which, as point cloud, likewise consists of individual points 12*a*.

Figure 4:
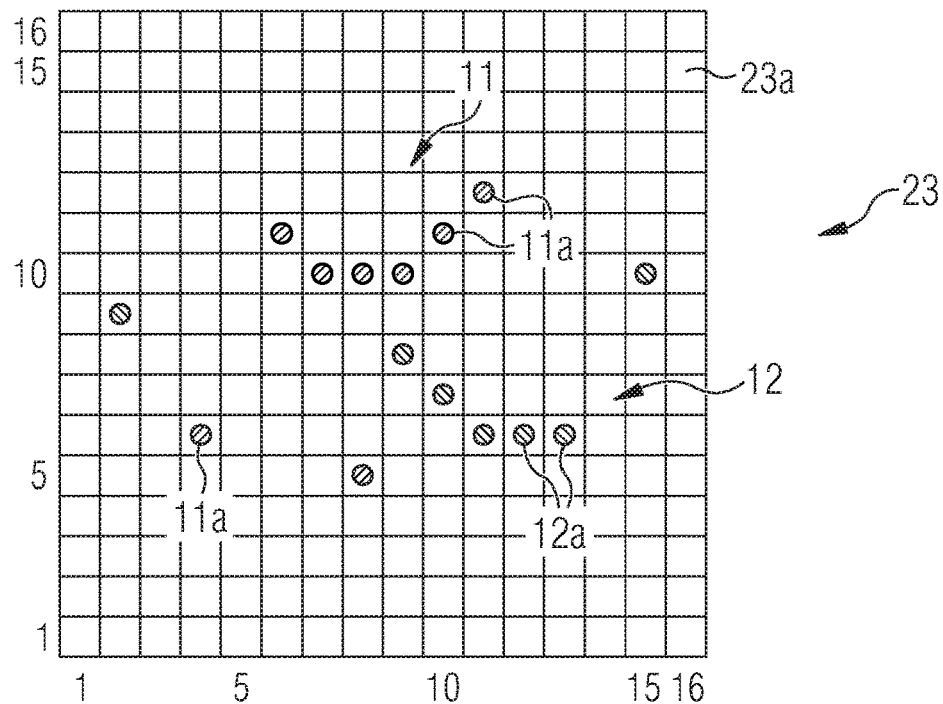
FIG. 4 shows a common voxel map with the first sensor data of FIG. 2 and the second sensor data of FIG. 3.

A common voxel map 23, in which the first sensor data 11 of FIG. 2 and the second sensor data 12 of FIG. 3 are illustrated, is shown in FIG. 4. The common voxel map 23 with voxels 23a comprises 16 columns and 16 rows. A voxel 23a was defined unambiguously by specifying the line/column.

The first sensor data 11 and the second sensor data 12, as they are shown in FIGS. 2 and 3, have no spatial relation to one another. A spatial relationship to one another is established only by the assignment of the points to voxels and then the merging in a common voxel map 23.

For the sake of a simplified illustration, the first sensor data 11, the second sensor data 12, and the common voxel map 23 as well as the third sensor data 28, which are then created therefrom (see FIG. 7), are illustrated in a two-dimensional manner, even though it goes without saying that they are typically present in a three-dimensional manner.

The points in the common voxel map 23 in the voxels 23a at the positions 5/8, 6/4, 10/7, 10/8, 10/9, 11/6, 11/10, 12/11 are points 11a of the first point cloud, while the points 12a of the second sensor data 12 are entered in the voxels 23a at the positions 6/11, 6/12, 6/13, 7/10, 8/9, 9/2, 10/15.

Figure 5:
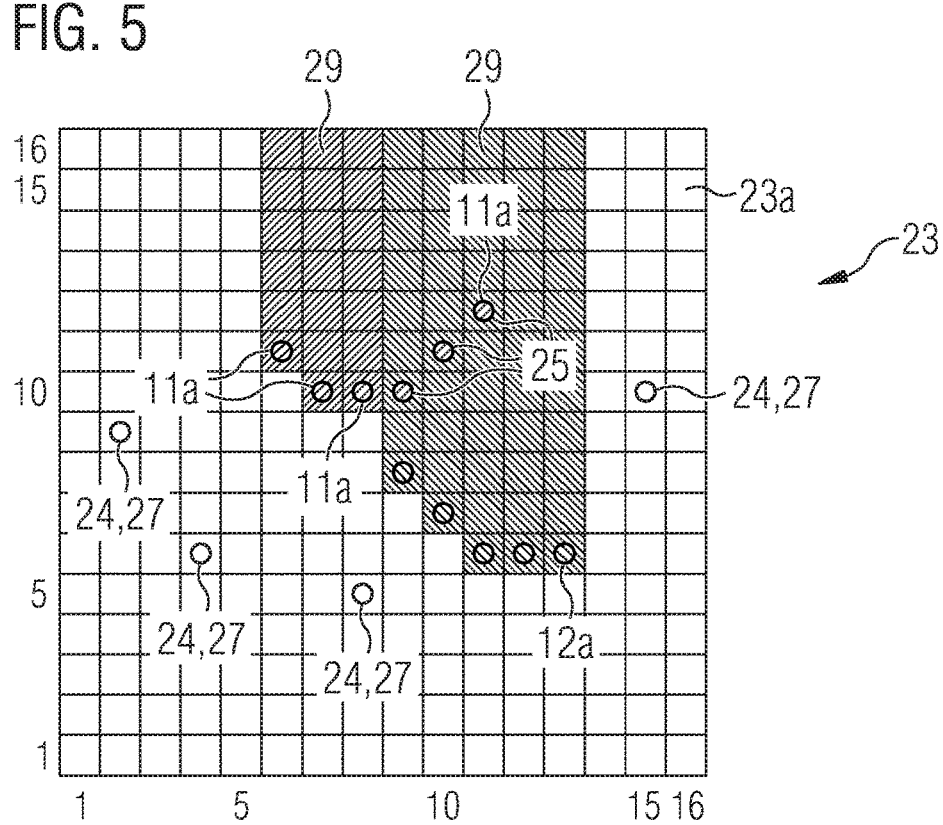
FIG. 5 shows the common voxel map of FIG. 4 after identification of noise points.

In FIG. 5, the voxel map of FIG. 4 is shown, after some points have already been identified as noise points 24. This relates to the points 9/2, 6/4, 5/8, and 10/15. These noise points 24 are classified as irrelevant points 27.

It can furthermore be seen in FIG. 5, how points 11a of the first sensor data and points 12a of the second sensor data create masked regions 29. This is so because all voxels 23a behind the points 11a at the positions 11/6, 10/7, and 10/8 are masked. The term "behind" refers to being arranged radially behind it, which, in the voxel map 23, means that the corresponding voxels 23a have a higher line number.

Analogously, the points 12a of the second sensor data 12 in the voxels 23a at the positions 8/9, 7/10, 6/11, 6/12, and 6/13 create a corresponding, masked region 29. Three points 11a of the first sensor data 11 lie in the masked region 29 and are classified as masked points 25. These are the points 11a in the voxels 23a at the positions 10/9, 11/10, 12/11.

Figure 6:
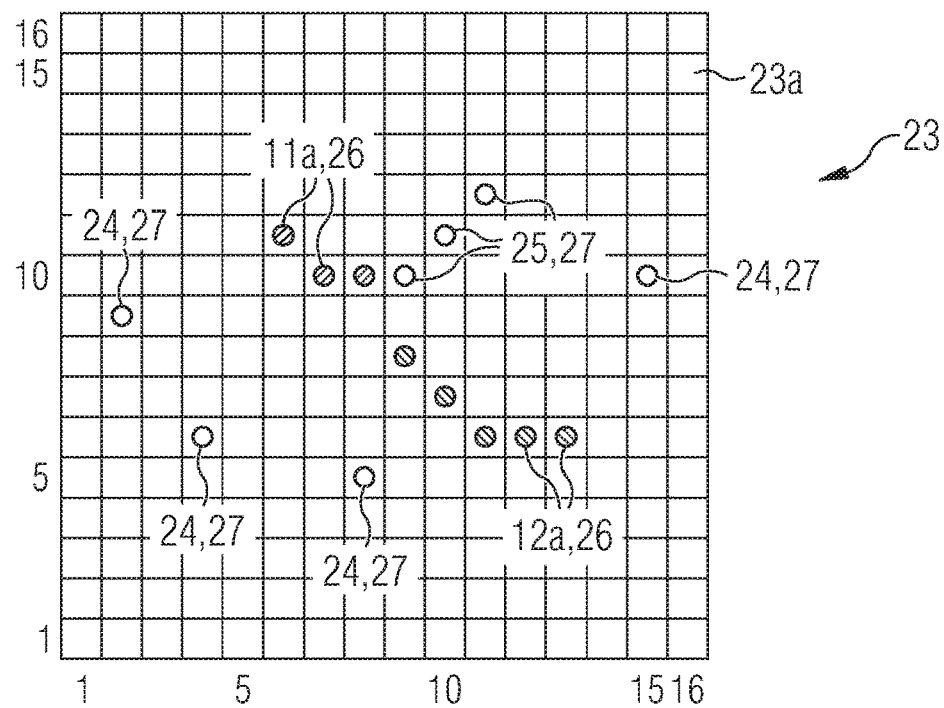
FIG. 6 shows the common voxel map of FIG. 5 after classification of masked points as not being relevant.

FIG. 6 shows the voxel map of FIG. 5, after the masked points 25 have been classified as not being relevant. The remaining points 11a of the first sensor data 11 and the remaining points 12a of the second sensor data 12 are further classified as being relevant points 26.

Figure 7:
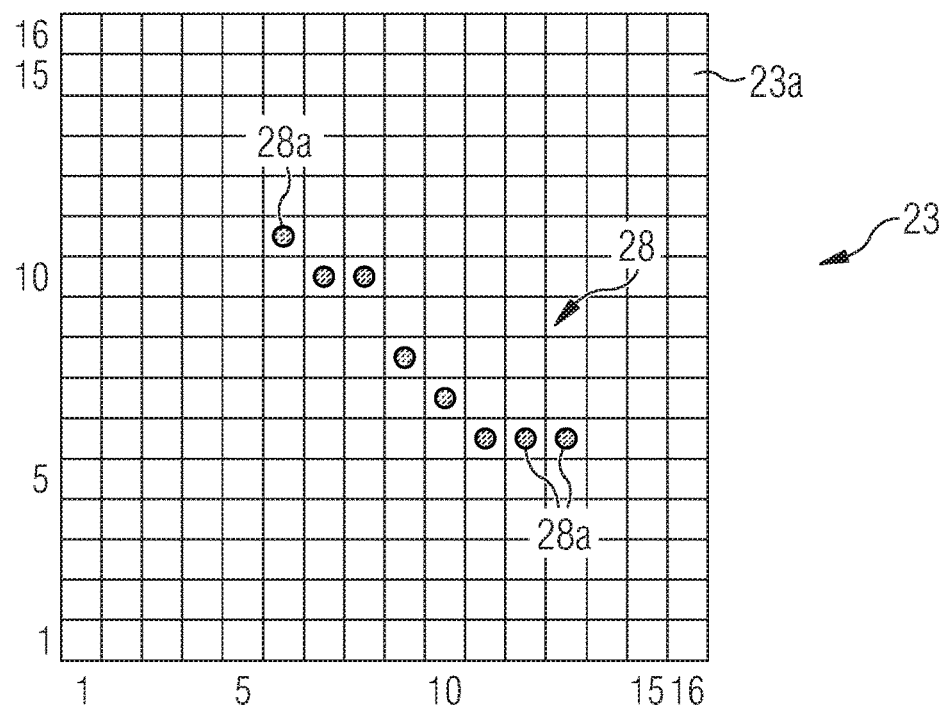
FIG. 7 shows a voxel map with the third sensor data of the combined scenario.

A voxel map with the third sensor data 28, which results by merging the points 26, which are classified as being relevant, of the first sensor data 11 and the points 26, which are classified as being relevant, of the second sensor data 12, is shown in FIG. 7. The third sensor data 28 likewise represent a point cloud with corresponding points 28a, namely with the points 28a in the voxels 23a at the positions 6/11, 6/12, 6/13, 7/10, 8/9, 10/7, 10/8, and 11/6.

Figure 8:
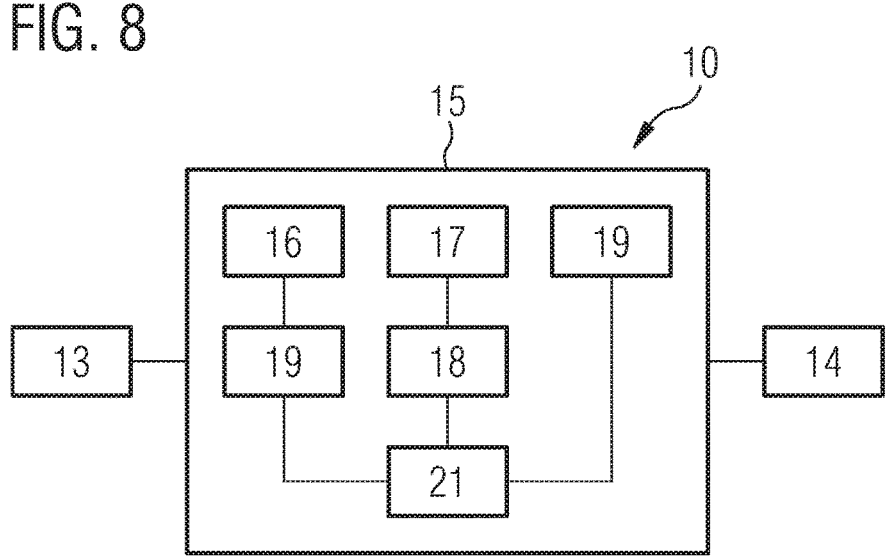
FIG. 8 shows a device according to the disclosure.

FIG. 8 shows a device 10 according to the disclosure, which can comprise a unit 13 for detecting the first sensor data 11 and the second sensor data 12. The device 10 further comprises a classification unit 15 and a unit 14 for merging the first sensor data 11 and the second sensor data 12.

The classification unit 15 can comprise a voxelizer 16, a free space identification unit 19, an object detection unit 17, an object merging unit 18, and a noise point identification unit 20, as well as a point cloud marker 21. The voxelizer 16 serves the purpose of representing the first sensor data 11 and the second sensor data 12 in a common voxel map 23, wherein the free space identification unit 19 classifies free voxels as free spaces. The object detection unit 17 serves the purpose of detecting objects and the object merging unit 18 serves the purpose of putting them in spatial relation to one another in order to detect possible masking and/or overlaps. The noise point identification unit 20 serves the purpose of identifying noise points 24. The point cloud marker 21 serves the purpose of classifying all points of the first sensor data 11 and of the second sensor data 12 as being relevant or not relevant. Only relevant points 26 are subsequently merged to form third sensor data 28 by means of the unit 14 for merging.

Figure 9:
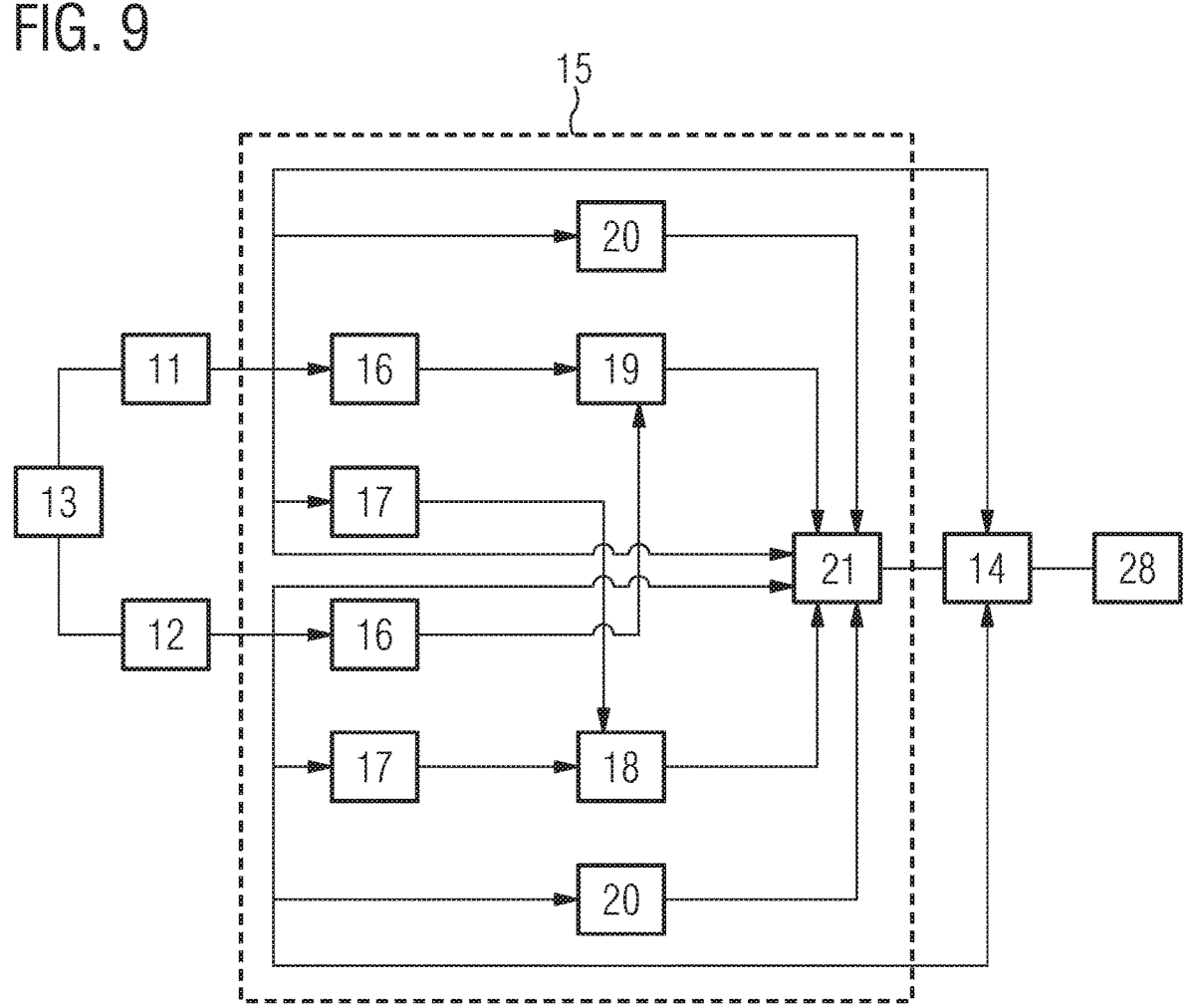
FIG. 9 shows a schematic sequence of a method according to the disclosure, integrated into the device according to FIG. 8.

A schematic diagram of the method 100, integrated into the device 10 according to FIG. 8, is shown in FIG. 9. The device 10 thereby does not have several illustrated units, such as, for example, voxelizers or object detection units, but it is only illustrated schematically in FIG. 9, which paths the sensor data cover within a device 10.

As input, first sensor data 11 and second sensor data 12 are provided, which are fed to the classification unit 15, namely first to the voxelizer 16 and subsequently to the free space identification unit 19, in order to represent the first sensor data 11 and the second sensor data 12 in a common voxel map 23 and to identified free voxels as free spaces.

The first sensor data 11 and the second sensor data 12 are further fed to the object detection unit 17 and subsequently to the object merging unit 18, in order to compare the positions of the detected objects to one another and in order to detect possible overlaps and/or masking.

The first sensor data and the second sensor data are additionally fed to the noise point identification unit 20, which can identify noise points 24.

The point cloud marker 21 can subsequently mark the noise points and identified points, which are masked or which are otherwise classified as not being relevant, as not being relevant, while the remaining points are marked as being relevant. The relevant classified points 26 are fed to the unit 14 for merging the first sensor data 11 and the second sensor data 12, which merges them to form third sensor data 28.

What is claimed is:

1. A method comprising:
   generating a first point cloud representing a first scene, wherein the generating the first point cloud includes sending and receiving first pulses from a Lidar sensor measuring first received energies;
   generating a second point cloud representing a second scene, wherein generating the second point cloud includes sending and receiving second pulses from the Lidar sensor and measuring second received energies;
   voxelizing the first point cloud to create a first voxel map representing the first scene;
   voxelizing the second point cloud to create a second voxel map representing the second scene;
   marking voxels in the first voxel map as occupied when associated first received energies are above a threshold;
   marking voxels in the second voxel map as occupied when associated second received energies are above the threshold;
   comparing the first voxel map and the second voxel map to determine at least one masked voxel in the first voxel map that is located radially behind at least one corresponding occupied voxel in the second voxel map; and
   combining the first voxel map and the second voxel map to create a third voxel map representing a combined scene, wherein the combining includes discarding the at least one masked voxel.

2. The method according to claim 1, further comprising:
   marking voxels in the first voxel map as noise points when associated first received energies are below a second threshold.

3. The method according to claim 2, further comprising marking voxels in the second voxel map as noise points when associated second received energies are below the second threshold.

4. The method according to claim 3, wherein the combining the first voxel map and the second voxel map to create the third voxel map includes discarding the noise points.

5. The method according to claim 1, further comprising:
detecting at least one first object in the first voxel map based on voxels marked as occupied in the first voxel map.

6. The method according to claim 5, further comprising:
detecting at least one second object in the second voxel map based on voxels marked as occupied in the second voxel man.

7. The method according to claim 6, wherein the combining the first voxel map and the second voxel map to create the third voxel map includes discarding the at least one first object when first object overlaps with the at least one second object.

8. The method according to claim 1, wherein the combining the first voxel map and the second voxel map to create the third voxel map comprises combining the first voxel map and second voxel map into a common coordinate system.

9. The method according to claim 1, further comprising:
generating a first ground truth for the first scene and generating a second ground truth for the second scene.

10. The method according to claim 9, further comprising:
merging the first ground truth with the second ground truth to form a ground truth of the combined scene.

11. The method according to claim 10, further comprising:
detecting, using a neural network with weights, at least one third object within the third voxel map representing the combined scene.

12. The method according to claim 11, further comprising:
training the neural network with weights using the ground truth of the combined scene.

13. A device for generating combined scenes for testing an object detection unit, the device comprising:
a computer;
a memory coupled to the computer, the memory including instructions store thereon that, when executed by the computer, facilitate performance of operations, the operations comprising:
generating a first point cloud representing first scene, wherein the generating the first point cloud includes sending receiving first pulses from a Lidar sensor and measuring first received energies;
generating a second point cloud representing a second scene, wherein the generating the second point cloud includes sending and receiving second pulses from the Lidar sensor and measuring second received energies;
voxelizing the first point cloud to create a first voxel map representing the first scene;
voxelizing the second point cloud to create a second voxel map representing the second scenes;
marking voxels in the first voxel map as occupied when associated first received energies are above a threshold;
detecting, using a neural network in the object detection unit, at least one first object in the first voxel map;
marking voxels in the second voxel map as occupied when associated second received energies are above the threshold;
detecting, using the neural network in the object detection unit, at least one second object in the second voxel map;
comparing the first voxel map and the second voxel map to determine at least one overlapping voxel in the at least one first object in the first voxel map that is co-located with a corresponding voxel in the at least one second object in the second voxel map; and
combining the first voxel map and the second voxel map to create a third voxel map representing a combined scene, wherein the combining includes discarding the at least one overlapping voxel.

14. The device of claim 13, wherein the operations further comprise:
detecting, using the neural network, at least one third object within the third voxel map representing the combined scene.

15. The device of claim 14, wherein the operations further comprise:
training the neural network using a ground truth of the combined scene.

16. A non-transitory machine-readable medium comprising executable instructions that, when executed by a computer, facilitate performance of operations, the operations comprising:
generating a first point cloud representing a first scene, wherein the generating the first point cloud includes sending and receiving first pulses from a Lidar sensor and measuring first received energies;
generating a second point cloud representing a second scene, wherein the generating the second point cloud includes sending and receiving second pulses from the Lidar sensor and measuring second received energies;
voxelizing the first point cloud to create a first voxel map representing the first scene;
voxelizing the second point cloud to create a second voxel map representing the second scene;
marking voxels in the first voxel map as noise points when associated first received energies are below a threshold;
marking voxels in the second voxel map as noise points when associated second received energies are below the threshold; and
combining the first voxel map and the second voxel map to create a third voxel map representing a combined scene, wherein the combining includes discarding the noise points.

17. The non-transitory machine-readable medium of claim 16, wherein the operations further comprise detecting at least one first object in the first voxel map.

18. The non-transitory machine-readable medium of claim 17, wherein the operations further comprise detecting at least one second object in the second voxel map.

19. The non-transitory machine-readable medium of claim 18, wherein the combining the first voxel map and the second voxel map to create the third voxel map includes discarding the at least one first object when first object overlaps with the at least one second object.

20. The non-transitory machine-readable medium of claim 19, wherein the operations further comprise training a neural network used to detect the at least one first object using a ground truth of the combined scene.

* * * * *